United States Patent Office 3,741,904
Patented June 26, 1973

3,741,904
PROCESS FOR PREPARATION OF A PROTECTED GRANULE AND DISHWASHING COMPOSITION FORMED THEREWITH
Richard Hans Christensen, Western Springs, Earl Edward Combs, Crestwood, and Mario Albert Petrone, Oak Park, Ill., assignors to Miles Laboratories, Inc., Elkhart, Ind.
No Drawing. Filed May 5, 1971, Ser. No. 140,606
Int. Cl. C11d 7/56
U.S. Cl. 252—99
5 Claims

ABSTRACT OF THE DISCLOSURE

A protected granule is prepared by adding to a builder salt an aqueous solution of a nonionic surfactant and subsequently adding a liquid sodium silicate having an $SiO_2/Na_2O$ ratio between 2.4 and 2.5 inclusive and a viscosity at 68° F. of between about 1700 and 2200 centipoises inclusive. This protected granule may be combined with a chlorine releasing agent to form an improved dishwashing composition.

FIELD OF THE INVENTION

This invention relates to a novel process for preparing a dry, water-soluble, protected granule having a predetermined range of size and an improved dishwashing composition having a substantially stable releasable chlorine value comprising the protected granule and a chlorine releasing agent.

DESCRIPTION OF THE PRIOR ART

With the advent of the wide spread use of automatic dishwashers, extensive efforts have been made to develop dry readily soluble dishwashing compositions including alkaline builder salts, surfactants, silicates and chlorine releasing agents. The processes developed for preparing these compositions often resulted in particle sizes which were not uniform and therefore required, as a part of the processing, grinding and sizing steps. Also, these compositions suffered from degradation of the chlorine releasing agents because the builder salts therein included releasable water molecules. To adjust for the instability caused by these water molecules, these compositions were often limited to the use of chlorinated trisodium phosphate as a source of chlorine for bleaching.

In the prior art compositions, there was a tendency for the chlorine releasing agent, i.e. chlorinated trisodium phosphate, to separate and settle to the bottom of the mixture with the result that nonuniform chlorine values occurred from one wash to another.

SUMMARY OF THE INVENTION

This invention is embodied in a process for preparing a dry, water-soluble, protected granule having a predetermined range of size comprising a water-soluble alkaline builder salt, a nonionic surfactant and a sodium silicate. When visually inspected, the protected granule prepared according to the invention appears to have a glassy finish. This finish appears to protect or seal the granule such that the ingredients therein are maintained in a stable state. When components are physically blended with the granule that are incompatible with the ingredients therein, no deterioration of components or granule occurs. This latter characteristic is believed to be a result of the observed finish on the granule.

In the process of the invention a solution of a nonionic surfactant and water is added to a dry blend including a water-soluble alkaline builder salt while such dry blend is agitated to form a dry granular combination of such solution and said builder salt. While the agitation of the dry granular combination is continued, a liquid sodium silicate is added thereto having an $SiO_2/Na_2O$ ratio of between about 2.4 and 2.5 inclusive with a viscosity at 68° F. between about 1700 and 2200 centipoises inclusive, to form a protected granule.

The invention also relates to a dry granular dishwashing composition comprising the protected particle and a dry chlorine releasing agent.

DESCRIPTION OF PREFERRED EMBODIMENTS

In the process of this invention, a dry blend is prepared which includes at least one water-soluble alkaline builder salt or equivalent material and which may include other dry ingredients such as dyes, fillers, etc. Although the process by which the dry blend is obtained is not considered critical, it has been found beneficial to prepare the blend in equipment into which a liquid may be subsequently dispersed while maintaining a nearly ideal mixing condition of the solids.

A solution of a nonionic surfactant and water is added to the dry blend while agitation of the dry blend is maintained. In the practice of this invention, it is preferred that during this addition period a nearly ideal mixing of the dry blend be maintained. This solution is beneficially added uniformly to the agitated dry blend. Such uniform addition may be obtained with a unit that results in a fine dispersion (spray or mist) of solution that contacts the dry blend as it is agitated.

Following the addition of the desired amount of solution, a liquid silicate is added to the combined dry blend and surfactant while they are maintained in the substantially ideal mixing condition. The silicate is preferably added in a manner similar to the nonionic surfactant solution. Although with proper equipment the silicate may be added while at room temperature, the silicate may be heated to between about 100° F. and 190° F. prior to addition, and is preferably heated to between 120° F. and 140° F. prior to addition. With the completion of this step a protected granule is formed of the desired size range for incorporation, particularly, in a dishwashing composition.

After the formation of the protected granules, other dry ingredients, such as a chlorine releasing agent, may be added thereto and agitated therewith to form the desired dishwashing composition.

The process of this invention may be carried out with mixing equipment that is suitable for mixing particulate solids, such as powders or granules, of the sizes defined herein and applying a liquid to such solids, while they are being agitated. Preferably, a twin shell tumble blender having an intensifier bar is used. Such a unit is formed from two cylinders cut at an angle and joined together with their axes intersecting at an angle of nearly 90° to form a V-shaped blender drum. The drum is mounted for rotation about an axis perpendicular to the axis of the V and coplanar with the axes of the drum cylinders. Such a blender permits a nearly ideal blending of dry components. The intensifier bar is mounted for rotation along the axis of rotation of the blender drum and is provided with discharge means for applying a fine dispersion of liquid to the dry components in the drum as they are being mixed by rotation of the drum. Other blenders that are suitable for the process of this invention are well known in the art and are generally described in known chemical engineering references. One such description may be found in Chemical Engineering, Aug. 8, 1960, pp. 123 to 125.

It has also been found advantageous, although it is not considered critical, to maintain the interior of the mixer at sub-atmospheric pressure during the preparation of the protected granule. Such pressure may be between atmospheric pressure and about 0.96 pound per square inch absolute pressure.

The protected granule prepared according to the process of this invention is beneficial in its desirable flow characteristics. Also, the granule size is compatible with other ingredients generally used in dishwashing detergents such that there is no stratifying of ingredients during storage and use. These granules have the following range of size according to standard screens, expressed in weight percent of protected granules produced, 0–2% retained on number 8 (0.937" opening), 25% minimum retained (cumulative) on number 20 (0.0331" opening) and 8% maximum through number 60 (0.0098" opening). This distribution is also desirable in that the density of the product is compatible with the design of current equipment in which such product will be used.

To achieve the advantageous protected granule resulting from the process of this invention, it is considered critical that the liquid sodium silicate selected possess particular properties. It is preferred that the sodium silicate have an $SiO_2/Na_2O$ ratio of between 2.4 to 2.5 inclusive. It is essential that the viscosity of such liquid sodium silicate, at 68° F., be between about 1700 to 2200 centipoises, inclusive. Preferably, the viscosity will be between about 2000 and 2200 centipoises. These parameters for the liquid sodium silicate are considered essential since it has been observed that silicates having higher or lower $SiO_2/Na_2O$ ratios and viscosities result in granules having a range of size that is either smaller or larger than desired, and having other undesirable properties. Between about 5 and 40 weight percent of silicate solution based upon the protected granule weight is preferred.

The nonionic surfactant included in the composition prepared according to the process of this invention may be selected from the many which are commercially available. Advantageously these surfactants are selected from those that have been found satisfactory for use in dishwashing compositions. The surfactants are normally liquid, organic, nonionic surface active agents such as polyoxyethylene compounds, oxylated alkyl phenols, oxylated aliphatic alcohols, polyoxyalkylene polymers or normal fatty alcohol ethylene oxide condensates. As stated, these nonionic surfactants are well known and are listed in many references, such as, "Encyclopedia of Chemical Technology," Kirk-Othmer, 2nd ed., vol. 19 (Interscience) starting at p. 531. Commercially available nonionic surfactants such as Plurafac RA 43 (s) (BASF-Wyandotte), TRITON CF54 and TRITON CF76 (Rohm & Haas), and ANTAROX LF series (General Aniline and Film) have been found particularly advantageous in the practice of the novel process of this invention. Such surfactant advantageously comprises between about 0.5 and 5 weight percent based upon the weight of the protected granule.

The inorganic, water-soluble, alkaline builder salt is advantageously selected from the group of compounds which has found wide acceptance for use in dishwashing compositions. Such material has been found suitable for these compositions because of its cleaning capabilities and because it does not have adverse effects upon dishes being cleaned. An important property of such a builder relates to the control of alkalinity of the washing solution so as to protect the glaze on dishes being cleaned. This builder may be selected from alkaline metal carbonates, borates, phosphates, polyphosphates, or bicarbonates. More particularly, the builder may comprise a combination of ingredients selected from sodium tripolyphosphate, tetrasodiumpyrophosphate, sodium carbonate, tetrapotassium phosphate, disodium orthophosphate, trisodium phosphate, sodium bicarbonate or sodium hexametaphosphate. The selection of a particular builder is not considered critical in practicing the process of this invention. However, it is preferred that the particles of such builder fall within the range of size of 1% by weight of particles maximum retained on a number 10 Tyler sieve and 10% by weight of particles maximum through a number 100 Tyler sieve. The builder beneficially comprises between about 40 and 90 weight percent of the protected granule.

Because of the unique quality of the protected granule formed of the nonionic surfactant, builder salt and silicate, in this process, it is possible to incorporate in a dishwashing composition of which the protected granule is a part thereof, a chlorine releasing agent selected from the numerous commercially available dry chlorine releasing agents. Examples of such chlorine releasing agents include chlorinated trisodium phosphate, potassium dichloroisocyanurate, hypochlorites, dichlorocyanuric acid, trichlorocyanuric acid and similar well known materials. Although the chlorine releasing agent may be selected from the above well known materials, it is particularly advantageous in practicing this invention to utilize a chlorinated cyanurate compound because of its higher releaseable chlorine content. Also, the particle size of the latter chlorine releasing agent substantially corresponds with the size of the protected granule. This similarity of size appears to provide a stability of distribution of discrete components in the total composition which results in a uniformity of properties and performance throughout a given container and from one batch to another of the composition produced in accordance with this invention.

Other materials which are commonly used in dishwashing compositions may be incorporated in the composition prepared according to this invention. Such materials may include dyes, fillers, perfumes, etc. If these materials are dry, they may be blended with the dry ingredients at the proper time according to the process or post blended, as is the chlorine releasing agent. If these ingredients are liquid, they may similarly be added according to the proper time in the process described.

The process of this invention will be further understood by reference to the following examples which are included for the purpose of illustration and are not intended to be construed in any way as limiting the scope of the invention which is defined in the claims appended hereto.

EXAMPLE 1

Protected granules were prepared according to the following process. A dry blend, 417 pounds, was placed in a twin shell tumble blender such as the one previously described.

Dry blend

| Ingredient: | Weight percent of dry blend |
|---|---|
| Sodium tripolyphosphate | 79.07 |
| Sodium sulfate | 20.87 |
| Dye [1] | .05 |

[1] A dry pigment dye.

This blender was a Solids Processer manufactured by Patterson-Kelley. The blender was fabricated from stainless steel and was jacketed so that the entire blender could be heated or cooled as desired. Fittings were also provided for the addition of liquids through a rotating intensifier bar inside the blender.

The blender was rotated at about 19 revolutions per minute (r.p.m.) for one minute after the addition thereto of the above ingredients.

With the blender rotating at 19 r.p.m. and an absolute pressure of about 0.97 pound per square inch applied to the blender interior, 70 pounds of a solution of 25% primary aliphatic oxyethylated alcohol, 0.8% perfume, and 74.2% water was added to the dry blend through the rotating intensifier bar at the rate of 11 pounds per minute. The solution was fed to the intensifier bar which was rotated at a speed providing a peripheral velocity of 3500 feet per minute. The solution was dispersed through two 0.02 inch diameter openings in the wall of the intensifier bar.

The rotation of the blender was continued as a liquid silicate (87 pounds) having an $SiO_2/Na_2O$ ratio of 2.4 and a viscosity of 2200 centipoises at 68° F. was pumped to the rotating intensifier bar at the rate of 11 pounds per minute. The silicate was maintained at 140° F. during the addition. The temperature of the mix in the blender rose to about 140° F. during this addition.

Upon completion of the addition of the silicate, the rotation of the blender was continued until the temperature of the mix therein fell to about 110° F. The rotation of the blender was then terminated and the blender opened.

A sample of the protected granules was removed from the blender and observed to have a uniform appearance and good flow characteristics. The granules were screened and less than 2% thereof was retained on a No. 8 screen.

Seven pounds of ACL 66, a chlorinated cyanurate bleach available from Monsanto Company, was then added to the protected granules remaining in the blender and the blender was again closed. The blender was then rotated at 19 r.p.m. for about 1 minute to mix the protected granules and the ACL 66, a chlorine releasing agent, to form the desired dishwashing composition.

The storage characteristics of the composition were evaluated by preparing packages of 1.25 pounds of composition sealed in a cardboard box with a metal foil overwrap. After 9 months of storage at room temperature, the composition was evaluated and found to have lost between 0% and 10% of the available chlorine and to have maintained substantially the same granule size and distribution of ingredients as the original compositions.

The performance of the composition was evaluated according to a modified combination of standards established by the Association of Home Appliance Manufacturers and the Chemical Specialties Manufacturers Association. In this procedure, dishes, glasses and utensils were soiled with various materials such as spinach, ketchup, mustard, eggs, cooked wheat cereal, etc. and permitted to stand for 3 hours at room temperature so that these materials could harden thereon. These items were washed in commercially available dishwashers with the recommended amount of dishwashing composition. The water supplied to the dishwashers was maintained at 140° F. Upon completion of the standard dishwashing cycle, the items were removed from the dishwashers and examined visually for soil removal.

The composition of this example was observed to remove substantially 100% of the soil from the aforedescribed items when so used. The glasses were observed to be substantially free of film, spots or other undesirable residue. The dishwashing performance of this composition was rated as substantially equivalent to products commercially available for home use.

EXAMPLE 2

The procedure of this example was substantially the same as Example 1 except that a liquid silicate (about 26% by weight of the protected granule) having an $SiO_2/Na_2O$ ratio of 2 and a viscosity of 350 centipoises at 68° F. was substituted for the liquid silicate used in Example 1. The resulting granule was undesirable in that its moisture content was too high, resulting in deterioration of the subsequently added chlorine releasing agent. Moreover, the size of the granules was too large because of caking.

EXAMPLE 3

The procedure of this example was substantially the same as that of Example 2 except that 15% by weight of the protected granule of liquid silicate was used. The resulting granule was not suitable in that it was too wet and the granule size was too large.

EXAMPLE 4

The procedure of this example was substantially the same as Example 1 except that a liquid silicate (15% by weight of the protected granule) having an $SiO_2/Na_2O$ ratio of 2.4 and a viscosity of 1000 centipoises was used. The resulting granule was unsuitable in that the granule size was too fine and therefore, did not possess the desired flowability and density.

EXAMPLE 5

The procedure of this example was substantially the same as Example 1 except that the dry blend had the following composition:

| Ingredient: | Weight percent of dry blend |
|---|---|
| Sodium tripolyphosphate | 79.30 |
| Sodium sulfate | 9.64 |
| Sodium carbonate | 11.00 |
| Dye | .05 |

The protected granule prepared according to these conditions was substantially identical to that of Example 1 in appearance, stability and performance.

EXAMPLE 6

The procedure of this example was substantially the same as that of Example 1 except that the dry blend had the following composition:

| Ingredient | Weight percent of dry blend |
|---|---|
| Sodium tripolyphosphate | 73.50 |
| Sodium sulfate | 21.00 |
| Sodium carbonate | 5.40 |
| Dye | .05 |

The protected granule prepared according to these conditions was substantially identical to that of Example 1 in appearance, stability and performance.

What is claimed is:

1. A process for preparing a dry, water-soluble, protected detergent granule which process comprises agitating a builder salt in particulate form said salt being selected from an alkaline metal carbonate, borate, phosphate, polyphosphate or bicarbonate while adding thereto an aqueous solution of a nonionic surfactant while maintaining its discrete particulate form, said surfactant being selected from the group consisting of polyoxyethylene, oxylated alkyl phenol, oxylated aliphatic alcohol, polyoxyalkylene polymer and normal fatty alcohol ethylene oxide condensate, and continuing the agitation of the discrete particles while adding thereto an aqueous solution of sodium silicate having an $SiO_2/Na_2$ ratio of between about 2.4 and 2.5 inclusive and a viscosity at 68° F. of between about 1700 and 2200 centipoises inclusive, whereby said silicate combines with said discrete particles to form a protected granule.

2. A process according to claim 1 wherein said silicate solution is heated to a temperature of between 100° F. and 190° F. inclusive prior to the addition thereof.

3. A process according to claim 1 wherein said builder is present in an amount between about 40 and 90 percent of said protected granule, said surfactant is present in an amount between about 0.5 and 5 percent of said protected granule and said silicate is present in an amount between about 5 and 40 percent of said protected granule.

4. A process according to claim 1 wherein sodium sulfate is blended with said builder prior to the addition thereto of said nonionic surfactant.

5. A dry, water-soluble, granular dishwashing composition having a substantially stable releasable chlorine value and a predetermined range of size of granule consisting essentially of a protected granule prepared according to claim 1 and a chlorine releasing agent selected from the group consisting of chlorinated trisodium phosphate, chlorinated cyanurates and hypochlorites.

References Cited

UNITED STATES PATENTS

| 3,306,858 | 2/1967 | Obenle | 252—99 |
| 3,538,004 | 11/1970 | Gabler et al. | 212—135 X |
| 3,630,928 | 12/1971 | Fuchs | 282—99 |

MAYER WEINBLATT, Primary Examiner

U.S. Cl. X.R.

252—135